US012729275B2

(12) United States Patent
Hirabayashi et al.

(10) Patent No.: US 12,729,275 B2
(45) Date of Patent: Sep. 8, 2026

(54) METHOD FOR PRODUCING OIL-IN-WATER EMULSION

(71) Applicant: Kao Corporation, Tokyo (JP)

(72) Inventors: Daiki Hirabayashi, Odawara (JP); Michiya Takagi, Wakayama (JP); Minami Nakayama, Wakayama (JP); Daiki Watanabe, Wakayama (JP); Takafumi Kinoshita, Wakayama (JP)

(73) Assignee: KAO CORPORATION, Tokyo (JP)

( * ) Notice: Subject to any disclaimer, the term of this patent is extended or adjusted under 35 U.S.C. 154(b) by 491 days.

(21) Appl. No.: 18/284,656

(22) PCT Filed: May 16, 2022

(86) PCT No.: PCT/JP2022/020417

§ 371 (c)(1),
(2) Date: Sep. 28, 2023

(87) PCT Pub. No.: WO2022/244742

PCT Pub. Date: Nov. 24, 2022

(65) Prior Publication Data

US 2024/0174817 A1 May 30, 2024

(30) Foreign Application Priority Data

May 18, 2021 (JP) ................................ 2021-084130
Mar. 18, 2022 (JP) ................................ 2022-044501

(51) Int. Cl.

| | |
|---|---|
| ***C08J 3/05*** | (2006.01) |
| ***B01F 23/41*** | (2022.01) |
| ***B01F 23/451*** | (2022.01) |
| ***B01F 25/20*** | (2022.01) |

(52) U.S. Cl.

CPC ............. *C08J 3/05* (2013.01); *B01F 23/4105* (2022.01); *B01F 23/4145* (2022.01); *B01F 23/451* (2022.01); *B01F 25/20* (2022.01); *B01F 2215/0431* (2013.01); *B01F 2215/044* (2013.01); *B01F 2215/0481* (2013.01); *B01F 2215/0495* (2013.01); *C08J 2383/04* (2013.01)

(58) Field of Classification Search

None
See application file for complete search history.

(56) References Cited

U.S. PATENT DOCUMENTS

| | | | | |
|---|---|---|---|---|
| 4,996,004 | A | 2/1991 | Bücheler et al. | |
| 5,116,536 | A | 5/1992 | Bücheler et al. | |
| 5,938,581 | A | 8/1999 | Bibette et al. | |
| 7,022,651 | B1 * | 4/2006 | Lightcap, Jr. .......... | A01N 25/16 424/405 |
| 9,039,273 | B2 * | 5/2015 | Weitz ...................... | B01F 23/41 366/175.2 |
| 2002/0039596 | A1 | 4/2002 | Hartounian et al. | |
| 2019/0030497 | A1 * | 1/2019 | Baumstuemmler ... | B01F 23/811 |
| 2019/0169501 | A1 * | 6/2019 | Jasper ...................... | C09K 5/10 |

FOREIGN PATENT DOCUMENTS

| | | | |
|---|---|---|---|
| CN | 111568878 | A | 8/2020 |
| EP | 1 640 809 | A1 | 3/2006 |
| JP | 54-84630 | A | 7/1979 |
| JP | 58-95220 | U | 6/1983 |
| JP | 59-49832 | A | 3/1984 |
| JP | 5-154367 | A | 6/1993 |
| JP | 11-509473 | A | 8/1999 |
| WO | WO 2020/129723 | A1 | 6/2020 |

OTHER PUBLICATIONS

International Preliminary Report on Patentability and English translation of the Written Opinion of the International Searching Authority for International Application No. PCT/JP2022/020417, dated Nov. 30, 2023.
International Search Report (PCT/ISA/210) issued in PCT/JP2022/020417, dated Aug. 2, 2022.

* cited by examiner

*Primary Examiner* — Robert S Jones, Jr.
*Assistant Examiner* — Lily K Sloan
(74) *Attorney, Agent, or Firm* — Birch, Stewart, Kolasch & Birch, LLP

(57) ABSTRACT

In a method for producing an oil-in-water emulsion, a jet of an oil-in-water pre-emulsion (L1) containing an oil phase dispersed in a first aqueous phase is added to a second aqueous phase (L2).

22 Claims, 1 Drawing Sheet

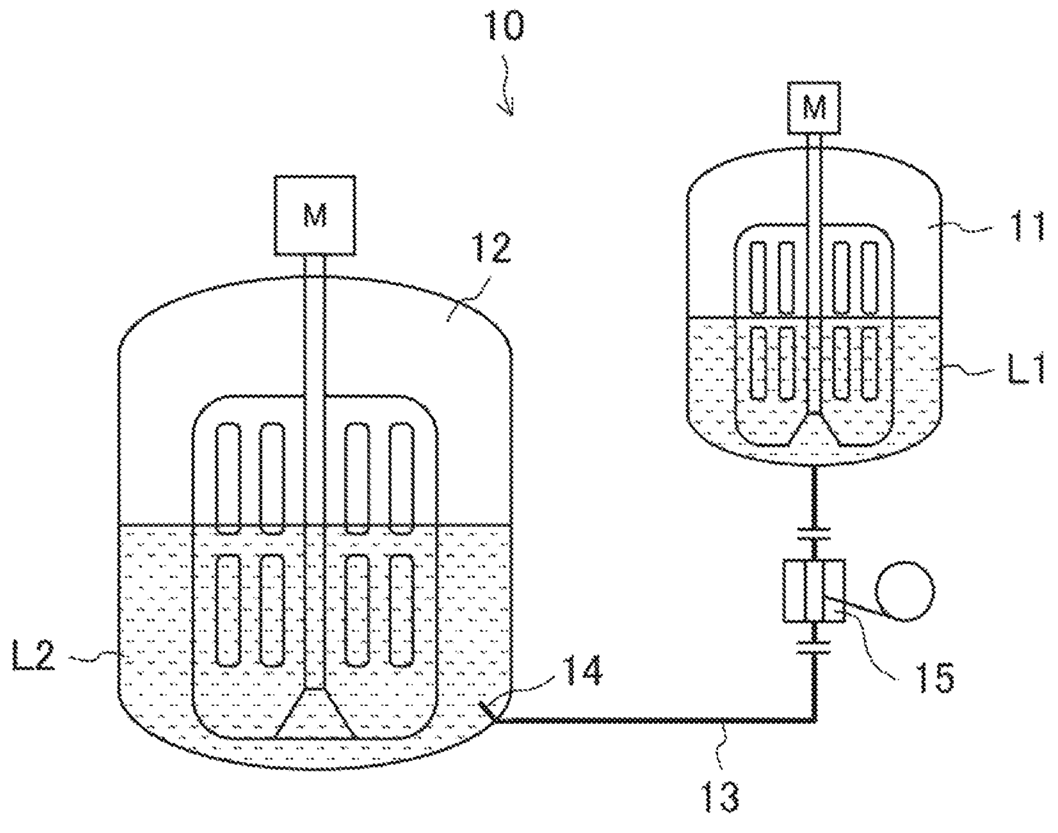
10
M
M
12
11
L1
L2
14
15
13

METHOD FOR PRODUCING OIL-IN-WATER EMULSION

TECHNICAL FIELD

The present invention relates to a method for producing an oil-in-water emulsion.

BACKGROUND ART

A method in which a raw material emulsion pre-produced is mixed with an aqueous or oil phase to produce an emulsion as a final product is known. For example, Patent Document 1 discloses a process in which as a starting material, a primary emulsion in which droplets of a phase A are dispersed in a phase B is placed in a container including a concentric cylinder, and a shear stress is applied to produce a secondary emulsion in which the diameter of the droplets of the phase A is smaller than that in the primary emulsion. Patent Document 2 discloses a method for producing an emulsion in which part of an aqueous phase and the whole of an oil phase, the whole of the aqueous phase and part of the oil phase, or part of the aqueous phase and part of the oil phase are continuously supplied to an emulsifier to produce a pre-emulsion, the pre-emulsion and the rest of the aqueous phase and/or the oil phase are supplied to another emulsifier, then stirred, and mixed.

A method in which one of two liquids is discharged in a jet state to the other is known. For example, Patent Document 3 discloses a method for producing a neutralized fatty acid including discharging a fatty acid blended liquid in a jet state to an aqueous basic solution.

CITATION LIST

Patent Documents

Patent Document 1: Japanese Unexamined Patent Publication No. H11-509473

Patent Document 2: Japanese Unexamined Patent Publication No. H5-154367

Patent Document 3: International Publication No. 2020/129723

SUMMARY OF THE INVENTION

The present invention is directed to a method for producing an oil-in-water emulsion including adding to a second aqueous phase a jet of an oil-in-water pre-emulsion containing an oil phase dispersed in a first aqueous phase.

BRIEF DESCRIPTION OF THE DRAWING

FIG. 1 is a view illustrating a configuration of an oil-in-water emulsion production apparatus used in Examples.

DESCRIPTION OF EMBODIMENTS

Hereinafter, embodiments will be described in detail.

A method for producing an oil-in-water emulsion according to an embodiment includes adding to a second aqueous phase a jet of an oil-in-water pre-emulsion containing an oil phase dispersed in a first aqueous phase. In the present application, a "jet state" is a state in which from a hole positioned in the second aqueous phase, spurt of the oil-in-water pre-emulsion containing the oil phase dispersed in the first aqueous phase, to a wide region filled with the second aqueous phase, formation of droplets of the pre-emulsion that have a smaller diameter than the pore diameter, and diffusion of the droplets can be visually confirmed. In the present application, "adding a jet of the pre-emulsion" means adding the oil-in-water pre-emulsion "in a jet state" to the wide space filled with the second aqueous phase from the hole positioned in the second aqueous phase.

Since high-shear mixing of an oil phase with an aqueous phase is not required for production of a low-viscosity emulsion, a mixer having a relatively simple structure can be used. Such a mixer is low in introduction and maintenance costs, has excellent cleaning performance, and is suitable for mass production.

In contrast, since high-shear mixing of an oil phase with an aqueous phase is required for production of a high-viscosity emulsion, a mixer having a complicated structure needs to be used. Such a mixer is high in introduction and maintenance costs, has inferior cleaning performance, and is not suitable for mass production, which are problems.

According to the method for producing an oil-in-water emulsion according to the embodiment, using an apparatus having a simple structure in which a blending tank having a jet discharge unit such as a jet nozzle is provided, an oil-in-water emulsion containing averagely small particles of the oil phase can be produced regardless of viscosity thereof by adding a jet of the pre-emulsion to the second aqueous phase stored in the blending tank from the jet discharge section. This is considered to be because in the addition of jet of the pre-emulsion to the second aqueous phase, an oil-water interface has been formed already during jetting, and shearing by the jet is efficiently imparted to the interface of the oil phase, thereby promoting fining the oil phase.

Therefore, introduction and maintenance costs of such an apparatus can be reduced. Due to excellent cleaning performance of the apparatus, switching of the oil-in-water emulsion to be produced can be performed in a short time, and high productivity can be achieved. In addition, mass production of the oil-in-water emulsion in one lot is made possible.

In the method for producing an oil-in-water emulsion according to the embodiment, the oil phase and the first aqueous phase are first mixed to prepare the oil-in-water pre-emulsion. A method for preparing the pre-emulsion is not particularly limited, and examples thereof include general high-pressure emulsification, phase inversion emulsification, membrane emulsification, and D phase emulsification.

Examples of the oil phase include fragrances, oils, antioxidants, cool touch agents, dyes, pigments, silicones, solvents, and oil-soluble polymers. Suitably, the oil phase contains one or more of them. More suitably, the oil phase contains an oil and/or a silicone from the viewpoint of producing an oil-in-water emulsion containing the oil phase with a small average particle diameter and enhancing stability of the oil-in-water emulsion. Further suitably, the oil phase contains a silicone.

Suitably, the oil is an organic compound having a solubility of less than 1 g in 100 g of water. The solubility of the oil in 100 g of water is a solubility at 25° C. (1013.25 hPa). The solubility of the oil in 100 g of water may be suitably 0.5 g or less, more suitably 0.1 g or less, or 0 g. In a method for measuring solubility, a reference can be made to Journal of the Chemical Society of Japan 1985, No. 11, pp. 2116 to 2119, Journal of the Chemical Society of Japan 1982, No. 11, pp. 1830 to 1834, for example.

Examples of the oil include a liquid oil that is a liquid at 20° C. and a solid fat that is a solid at 20° C. The oil may contain a liquid oil alone, a solid fat alone, or both a liquid oil and a solid fat.

Examples of the oil include alcohols, ester oils, hydrocarbon oils, dialkyl ether compounds, amine compounds, amide compounds, fats and oils, and higher fatty acids. Suitably, the oil contains one or more of them. The oil may contain substances used as a fragrance, an antioxidant, a cool touch agent, a moisturizer, a dye, a pigment, and the like.

Examples of the silicone include dimethyl polysiloxane, methyl polysiloxane, methylphenyl polysiloxane, octamethyl cyclotetrasiloxane, decamethyl cyclopentasiloxane, methyl hydrogen polysiloxane, silicone resins, amino-modified silicones, alkyl-modified silicones, polyether-modified silicones, glyceryl-modified silicones, and silicone wax. Suitably, the silicone contains one or more of them. More suitably, the silicone contains dimethyl polysiloxane from the viewpoint of obtaining a dispersion liquid of fine particles. The silicone may contain substances used as a touch improver and a moisturizing component.

The first aqueous phase may be water alone or an aqueous solution containing a water-soluble substance dissolved in water. Examples of the water-soluble substance include thickeners and emulsion stabilizers. Suitably, the thickener contains one or more of polysaccharides from the viewpoint of enhancing the stability of the oil-in-water emulsion. More suitably, the thickener contains one or more selected from the group consisting of sodium alginate, carboxymethyl cellulose and a salt thereof, carrageenan, xanthan gum, sodium polyacrylate, hydroxyethyl cellulose, hydroxypropyl cellulose, pectin, tragacanth gum, gum arabic, guar gum, karaya gum, locust bean gum, gellan gum, tamarind gum, and psyllium seed gum. Further suitably, the thickener contains locust bean gum. Suitably, the emulsion stabilizer contains one or more of compounds having a polar group from the viewpoint of enhancing the stability of the oil-in-water emulsion. More suitably, the emulsion stabilizer contains one or more of neutral compounds. Further suitably, the emulsion stabilizer contains one or more of neutral polymers. Yet further suitably, the emulsion stabilizer contains a polyvinyl alcohol. The first aqueous phase may be a dispersion liquid containing dispersion particles dispersed in water.

A mass ratio (oil phase/first aqueous phase) of the content of the oil phase to the content of the first aqueous phase in the pre-emulsion is suitably 0.01 or more, more suitably 0.05 or more, further suitably 0.1 or more, yet further suitably 0.3 or more from the viewpoint of enhancing the degree of freedom of formulation. The mass ratio is suitably 4 or less, more suitably 3.5 or less, further suitably 3 or less, yet further suitably 2 or less from the viewpoint of obtaining a stable oil-in-water pre-emulsion.

The average particle diameter of the oil phase in the pre-emulsion is suitably 2,000 μm or less, more suitably 1,000 μm or less, further suitably 500 μm or less, yet further suitably 100 μm or less, yet further suitably 70 μm or less, and suitably 1 μm or more, more suitably 10 μm or more, from the viewpoint of producing an oil-in-water emulsion containing the oil phase with a small average particle diameter. Here, the average particle diameter of the oil phase in the present application is an area average particle diameter that is measured by a laser diffraction and scattering method with a laser diffraction/scattering particle size distribution measuring device.

In the method for producing an oil-in-water emulsion according to the embodiment, after the preparation of the pre-emulsion, a jet of the pre-emulsion is added to the second aqueous phase to obtain a final oil-in-water emulsion.

The second aqueous phase may be water alone, an aqueous solution containing a water-soluble substance dissolved in water, or a dispersion liquid containing dispersion particles dispersed in water, similarly to the first aqueous phase. Suitably, the constituent component of the second aqueous phase is the same as that of the first aqueous phase in the pre-emulsion. The composition of the second aqueous phase may be the same as or different from that of the first aqueous phase.

Suitably, a jet of the pre-emulsion is added to the second aqueous phase using a nozzle. Suitably, an end portion of the nozzle is in the second aqueous phase. The internal diameter of the nozzle is suitably 0.01 mm or more, more suitably 0.05 mm or more, further suitably 0.1 mm or more from the viewpoint of productivity, and suitably 20 mm or less, more suitably 10 mm or less, and further suitably 1 mm or less from the viewpoint of jetting the pre-emulsion. When the opening shape of the nozzle is not a perfect circle, the internal diameter of the nozzle is a hydraulic diameter of the opening shape.

The viscosity of the pre-emulsion at a temperature at which a jet of the pre-emulsion is added to the second aqueous phase is suitably 1 mPa·s or more, more suitably 10 mPa·s or more, further suitably 100 mPa·s or more from the viewpoint of reducing creaming of the pre-emulsion, and is suitably 15,000 mPa·s or less, more suitably 10,000 mPa·s or less, further suitably 6,000 mPa·s or less from the viewpoint of reducing pressure loss of the nozzle.

The viscosity of the second aqueous phase at a temperature at which a jet of the pre-emulsion is added is suitably 0.1 mPa·s or more, more suitably 0.5 mPa·s or more, most suitably 1.0 mPa·s or more from the viewpoint of reducing creaming of the oil-in-water emulsion to be produced, and is suitably 20,000 mPa·s or less, more suitably 10,000 mPa·s or less, further suitably 6,000 mPa·s or less, yet further suitably 1,000 mPa·s or less, yet further suitably 500 mPa·s or less, most suitably 10 mPa·s or less from the viewpoint of mixing property. Suitably, the viscosity of the second aqueous phase is lower than the viscosity of the pre-emulsion from the viewpoint of producing an oil-in-water emulsion containing the oil phase with a small average particle diameter.

A linear velocity of the pre-emulsion during the addition of a jet of the pre-emulsion to the second aqueous phase is suitably 5 m/s or more, more suitably 10 m/s or more, further suitably 20 m/s or more, yet further suitably 30 m/s or more from the viewpoint of producing an oil-in-water emulsion containing the oil phase with a small average particle diameter, and is suitably 100 m/s or less, more suitably 50 m/s or less, further suitably 40 m/s or less from the viewpoint of reducing apparatus load. Here, the "linear velocity of the pre-emulsion" in the present application is a velocity of a liquid in a discharge direction of the pre-emulsion. The absolute value of the linear velocity of the pre-emulsion is calculated by dividing the mass flow rate of the pre-emulsion by the density of the pre-emulsion, then dividing the resulting value by the area of the discharge hole, and converting the resulting value to a value per second.

A shear rate of the pre-emulsion during the addition of a jet of the pre-emulsion to the second aqueous phase is suitably 2,500 $s^{-1}$ or more, more suitably 5000 $s^{-1}$ or more, further suitably 10,000 $s^{-1}$ or more, yet further suitably 20,000 $s^{-1}$ or more, and yet further suitably 30,000 $s^{-1}$ or more from the viewpoint of efficiently shearing the oil-water interface between the pre-emulsion and the second aqueous phase to make the oil phase finer, and suitably 500,000 $s^{-1}$ or less, more suitably 400,000 $s^{-1}$ or less, and further suitably 300,000 $s^{-1}$ or less from the viewpoint of reducing the apparatus load. When a jet of the pre-emulsion is added to the second aqueous phase using a nozzle, the shear rate is calculated by dividing the linear velocity of the pre-emulsion by the internal diameter of the nozzle (the linear velocity of the pre-emulsion/the internal diameter of the nozzle).

The average particle diameter of the oil phase in the produced oil-in-water emulsion is suitably 35 μm or less, more suitably 30 μm or less, further suitably 20 μm or less, and suitably 1 μm or more.

A ratio (the average particle diameter of the oil phase in the oil-in-water emulsion/the average particle diameter of the oil phase in the pre-emulsion) of the average particle diameter of the oil phase in the oil-in-water emulsion to the average particle diameter of the oil phase in the pre-emulsion is suitably 0.001 or more, more suitably 0.01 or more, further suitably 0.1 or more from the viewpoint of producing an emulsion with energy saving, and suitably 0.9 or less, more suitably 0.7 or less, further suitably 0.6 or less from the viewpoint of producing a fine emulsion.

As for the above-mentioned embodiment, the present invention further discloses the following aspects.

[1] A method for producing an oil-in-water emulsion, the method including adding to a second aqueous phase a jet of an oil-in-water pre-emulsion containing an oil phase dispersed in a first aqueous phase.

[2] The method of [1], wherein the second aqueous phase has a viscosity from 0.1 mPa·s to 20000 mPa·s inclusive at a temperature at which the jet of the pre-emulsion is added.

[3] The method of [1] or [2], wherein the second aqueous phase has a viscosity from 0.1 mPa·s to 10000 mPa·s inclusive at a temperature at which the jet of the pre-emulsion is added.

[4] The method of any one of [1] to [3], wherein the second aqueous phase has a viscosity from 1 mPa·s to 10,000 mPa·s inclusive at a temperature at which the jet of the pre-emulsion is added.

[5] The method of any one of [1] to [4], wherein the second aqueous phase has a viscosity from 1 mpa·s to 6,000 mPa·s inclusive at a temperature at which the jet of the pre-emulsion is added.

[6] The method of any one of [1] to [5], wherein using a blending tank having a jet discharge section, the jet of the pre-emulsion is added from the jet discharge section to the second aqueous phase stored in the blending tank.

[7] The method of any one of [1] to [6], wherein a mass ratio of a content of the oil phase to a content of the first aqueous phase in the pre-emulsion is from 0.01 to 4 inclusive.

[8] The method of any one of [1] to [7], wherein a mass ratio of a content of the oil phase to a content of the first aqueous phase in the pre-emulsion is from 0.01 to 3 inclusive.

[9] The method of any one of [1] to [8], wherein a mass ratio of a content of the oil phase to a content of the first aqueous phase in the pre-emulsion is from 0.05 to 3 inclusive.

[10] The method of any one of [1] to [9], wherein a mass ratio of a content of the oil phase to a content of the first aqueous phase in the pre-emulsion is from 0.1 to 3 inclusive.

[11] The method of any one of [1] to [10], wherein a mass ratio of a content of the oil phase to a content of the first aqueous phase in the pre-emulsion is from 0.1 to 2 inclusive.

[12] The method of any one of [1] to [11], wherein the oil phase in the pre-emulsion has an average particle diameter of 2,000 μm or less.

[13] The method of any one of [1] to [12], wherein the oil phase in the pre-emulsion has an average particle diameter of 1,000 μm or less.

[14] The method of any one of [1] to [13], wherein the oil phase in the pre-emulsion has an average particle diameter from 1 μm to 500 μm inclusive.

[15] The method of any one of [1] to [14], wherein the oil phase in the pre-emulsion has an average particle diameter from 10 μm to 100 μm inclusive.

[16] The method of any one of [1] to [15], wherein the pre-emulsion has a viscosity from 1 mPa·s to 15,000 mPa·s inclusive at a temperature at which the jet of the pre-emulsion is added to the second aqueous phase.

[17] The method of any one of [1] to [16], wherein the pre-emulsion has a viscosity from 1 mPa·s to 10,000 mPa·s inclusive at a temperature at which the jet of the pre-emulsion is added to the second aqueous phase.

[18] The method of any one of [1] to [17], wherein the pre-emulsion has a viscosity from 1 mPa·s to 6,000 mPa·s inclusive at a temperature at which the jet of the pre-emulsion is added to the second aqueous phase.

[19] The method of any one of [I] to [18], wherein the pre-emulsion has a viscosity from 10 mPa·s to 6,000 mPa·s inclusive at a temperature at which the jet of the pre-emulsion is added to the second aqueous phase.

[20] The method of any one of [1] to [19], wherein the viscosity of the second aqueous phase (at a temperature at which the jet of the pre-emulsion is added) is lower than the viscosity of the pre-emulsion (at a temperature at which the jet of the pre-emulsion is added to the second aqueous phase).

[21] The method of any one of [1] to [20], wherein the second aqueous phase has the same constituent component as that of the first aqueous phase in the pre-emulsion.

[22] The method of any one of [1] to [21], wherein the oil phase in the produced oil-in-water emulsion has an average particle diameter of 35 μm or less.

[23] The method of any one of [1] to [22], wherein the oil phase in the produced oil-in-water emulsion has an average particle diameter of 30 μm or less.

[24] The method of any one of [1] to [23], wherein the oil phase in the produced oil-in-water emulsion has an average particle diameter of from 1 μm to 20 μm inclusive.

[25] The method of any one of [1] to [24], wherein a linear velocity of the pre-emulsion during addition of the jet of the pre-emulsion to the second aqueous phase is 5 m/s or more.

[26] The method of any one of [1] to [25], wherein a linear velocity of the pre-emulsion during addition of the jet of the pre-emulsion to the second aqueous phase is from 5 m/s to 100 m/s inclusive.

[27] The method of any one of [1] to [26], wherein a linear velocity of the pre-emulsion during addition of the jet of the pre-emulsion to the second aqueous phase is from 10 m/s to 100 m/s inclusive.

[28] The method of any one of [1] to [27], wherein the oil phase contains an oil and/or a silicone.

[29] The method of [28], wherein the oil contains one or more selected from the group consisting of an alcohol, an ester oil, a hydrocarbon oil, a dialkyl ether compound, an amine compound, an amide compound, fat and oil, and a higher fatty acid.

[30] The method of any one of [1] to [29], wherein the oil phase contains a silicone.

[31] The method of any one of [1] to [30], wherein the adding of the jet of the pre-emulsion to the second aqueous phase is performed using a nozzle.

[32] The method of [31], wherein the nozzle has an internal diameter from 0.01 mm to 20 mm inclusive.

[33] The method of [31], wherein the nozzle has an internal diameter from 0.05 mm to 10 mm inclusive.

[34] The method of [31], wherein the nozzle has an internal diameter from 0.1 mm to 1 mm inclusive.

[35] The method of any one of [1] to [34], wherein a shear rate of the pre-emulsion during addition of the jet of the pre-emulsion to the second aqueous phase is from 2,500 $s^{-1}$ to 500,000 $s^{-1}$ inclusive.

[36] The method of any one of [1] to [34], wherein a shear rate of the pre-emulsion during addition of the jet of the pre-emulsion to the second aqueous phase is from 5,000 $s^{-1}$ to 400,000 $s^{-1}$ inclusive.

[37] The method of any one of [1] to [34], wherein a shear rate of the pre-emulsion during addition of the jet of the pre-emulsion to the second aqueous phase is from 10,000 $s^{-1}$ to 300,000 $s^{-1}$ inclusive.

EXAMPLES (Oil-in-Water Emulsion Production Apparatus)

FIG. 1 is a view illustrating a configuration of an oil-in-water emulsion production apparatus 10 used in Examples.

The oil-in-water emulsion production apparatus 10 includes an auxiliary tank 11 and a blending tank 12. A liquid supply pipe 13 extends from the bottom of the auxiliary tank 11, and is connected to a circular jet nozzle 14 provided on the bottom side surface of the blending tank 12. The liquid supply pipe 13 is provided with a pump 15 for liquid delivery.

(Production of Oil-In-Water Emulsion)

Example 1 and Comparative Example 1

In Example 1, an oil-in-water pre-emulsion L1 containing an oil phase having a composition shown in Table 1 dispersed in a first aqueous phase at a mass ratio of the oil phase to the first aqueous phase of 0.5 was prepared and then placed in the auxiliary tank 11. A second liquid phase L2 having a composition shown in Table 1 was prepared and then placed in the blending tank 12. Commercially available materials used for the preparation of the oil phase and the first aqueous phase in the pre-emulsion L1 and the second aqueous phase L2 were as follows.

Silicone: methyl cyclopentasiloxane (TSF405A available from Momentive)

Oil: ethylhexyl methoxycinnamate (Uvinul MC80 available from BASF Japan)

Thickener: locust bean gum (SOALOCUST A120 available from Mitsubishi-chemical Foods Corporation)

Emulsion stabilizer: polyvinyl alcohol (GOHSENOL EG-05 available from Mitsubishi Chemical Corporation)

The pump 15 (diaphragm pump) was operated to supply the pre-emulsion L1 in the auxiliary tank 11 through the liquid supply pipe 13 to the second liquid phase L2 in the blending tank 12 under conditions shown in Table 1. At this time, the pre-emulsion L1 was discharged to the second liquid phase L2 from the jet nozzle 14 having an internal diameter of 0.35 mm, to produce an oil-in-water emulsion. At that time, spouting and diffusing of the pre-emulsion L1 from the jet nozzle 14 were visually observed through a transparent wall surface of the blending tank 12.

In Comparative Example 1, the same operation as in Example 1 was performed except for using a water-in-oil pre-emulsion having a mass ratio of an oil phase to a first aqueous phase of 5.0 and a second liquid phase that were prepared such that the composition of a final oil-in-water emulsion was the same as that in Example 1.

Examples 2 to 10 and Comparative Example 2

The same operation as in Example 1 was performed except that the conditions were changed to those shown in Tables 1 to 5.

Examples 11 and 12

In Example 11, an oil-in-water pre-emulsion L1 containing an oil phase having a composition shown in Table 6 dispersed in a first aqueous phase was prepared at a mass ratio of the oil phase to the first aqueous phase of 0.5 and then placed in the auxiliary tank 11. A second liquid phase L2 having a composition shown in Table 6 was prepared and then placed in the blending tank 12. Commercially available materials used in the preparation of the oil phase and the first aqueous phase in the pre-emulsion L1 and the second aqueous phase L2 were as described above.

The pump 15 (rotary pump) was operated to supply the pre-emulsion L1 in the auxiliary tank 11 through the liquid supply pipe 13 to the second liquid phase L2 in the blending tank 12 under conditions shown in Table 6. At this time, the pre-emulsion L1 was discharged to the second liquid phase L2 from the jet nozzle 14 having an internal diameter of 5 mm, to produce an oil-in-water emulsion. At this time, spouting and diffusing of the pre-emulsion L1 from the jet nozzle 14 were visually observed from above the blending tank 12.

In Example 12, the same operation as in Example 11 was performed except that the conditions were changed to those shown in Table 6.

TABLE 1

| | | | | Example 1 | Example 2 | Example 3 | Comparative Example 1 |
|---|---|---|---|---|---|---|---|
| Composition (mass %) | Pre-emulsion | Oil Phase | Silicone | 20 | 20 | 20 | 20 |
| | | | Oil | — | — | — | — |
| | | First Aqueous Phase | Thickener | 0.15 | 0.075 | 0.038 | 0.015 |
| | | | Emulsion Stabilizer | 0.2 | 0.1 | 0.05 | 0.02 |
| | | | Water | 39.65 | 19.83 | 9.913 | 3.965 |

TABLE 1-continued

| | | | Example 1 | Example 2 | Example 3 | Comparative Example 1 |
|---|---|---|---|---|---|---|
| | Second Aqueous Phase | Thickener | 0.15 | 0,225 | 0.263 | 0.285 |
| | | Emulsion Stabilizer | 0.2 | 0.3 | 0.35 | 0.38 |
| | | Water | 39.65 | 59.48 | 69.39 | 75.34 |
| Pre-emulsion | | Oil Phase/ First Aqueous Phase | 0.5 | 1 | 2 | 5 |
| | | Viscosity (mPa · s) | 187 | 622 | 1358 | — |
| | | Average Particle Diameter of Oil Phase (μm) | 55.6 | 59.1 | 59.5 | — |
| | | Phase State | O/W | O/W | O/W | W/O |
| | | Linear Velocity (m/s) | 29.5 | 29.6 | 30.2 | 30.5 |
| | | Shear Rate ($s^{-1}$) | 84000 | 85000 | 86000 | 87000 |
| Second Aqueous Phase | | Viscosity (mPa · s) | 35.7 | 35.7 | 35.7 | 35.7 |
| Oil-in-water emulsion | | Average Particle Diameter of Oil Phase (μm) | 15.4 | 15.4 | 13.5 | 29.8 |
| Average Particle Diameter of Oil Phase in Oil-in-water Emulsion/Average Particle Diameter of Oil Phase in Pre-emulsion | | | 0.28 | 0.26 | 0.23 | — |
| State of Discharged Fluid | | | Jet | Jet | Jet | Jet |

TABLE 2

| | | | | Example 4 | Example 1 | Example 5 | Example 6 |
|---|---|---|---|---|---|---|---|
| Composition (mass %) | Pre-emulsion | Oil Phase | Silicone | 20 | 20 | 20 | 20 |
| | | | Oil | — | — | — | — |
| | | First Aqueous Phase | Thickener | — | 0.15 | 0.3 | 0.6 |
| | | | Emulsion Stabilizer | 0.2 | 0.2 | 0.2 | 0.2 |
| | | | Water | 39.8 | 39.65 | 39.5 | 39.2 |
| | Second Aqueous Phase | Thickener | | — | 0.15 | 0.3 | 0.6 |
| | | Emulsion Stabilizer | | 0.2 | 0.2 | 0.2 | 0.2 |
| | | Water | | 39.8 | 39.65 | 39.5 | 39.2 |
| Pre-emulsion | | Oil Phase/ First Aqueous Phase | | 0.5 | 0.5 | 0.5 | 0.5 |
| | | Viscosity (mPa · s) | | 28.9 | 187 | 1030 | 5510 |
| | | Average Particle Diameter of Oil Phase (μm) | | 67.5 | 55.6 | 49 | 28.9 |
| | | Phase State | | O/W | O/W | O/W | O/W |
| | | Linear Velocity (m/s) | | 28.8 | 29.5 | 28.1 | 25.7 |
| | | Shear Rate ($s^{-1}$) | | 82,000 | 84000 | 80,000 | 73,000 |
| Second Aqueous Phase | | Viscosity (mPa · s) | | 2.8 | 35.7 | 324.2 | 5600 |
| Oil-in-water Emulsion | | Average Particle Diameter of Oil Phase (μm) | | 9 | 15.4 | 15 | 11.5 |
| Average Particle Diameter of Oil Phase in Oil-in-water Emulsion/Average Particle Diameter of Oil Phase in Pre-emulsion | | | | 0.13 | 0.28 | 0.31 | 0.40 |
| State of Discharged Fluid | | | | Jet | Jet | Jet | Jet |

TABLE 3

| | | | | Example 1 | Example 7 | Example 8 | Comparative Example 2 |
|---|---|---|---|---|---|---|---|
| Composition (mass %) | Pre-emulsion | Oil Phase | Silicone | 20 | 20 | 20 | 20 |
| | | | Oil | — | — | — | — |
| | | First Aqueous Phase | Thickener | 0.15 | 0.15 | 0.15 | 0.15 |
| | | | Emulsion Stabilizer | 0.2 | 0.2 | 0.2 | 0.2 |
| | | | Water | 39.65 | 39.65 | 39.65 | 39.65 |
| | Second Aqueous Phase | Thickener | | 0.15 | 0.15 | 0.15 | 0.15 |
| | | Emulsion Stabilizer | | 0.2 | 0.2 | 0.2 | 0.2 |
| | | Water | | 39.65 | 39.65 | 39.65 | 39.65 |

TABLE 3-continued

| | | Example 1 | Example 7 | Example 8 | Comparative Example 2 |
|---|---|---|---|---|---|
| Pre-emulsion | Oil Phase/ First Aqueous Phase | 0.5 | 0.5 | 0.5 | 0.5 |
| | Viscosity (mPa · s) | 187 | 187 | 187 | 187 |
| | Average Particle Diameter of Oil Phase (μm) | 55.6 | 59.6 | 59.1 | 54.4 |
| | Phase State | O/W | O/W | O/W | O/W |
| | Linear Velocity (m/s) | 29.5 | 18.6 | 11.5 | 2.8 |
| | Shear Rate ($s^{-1}$) | 84000 | 53,000 | 33,000 | 8,000 |
| Second Aqueous Phase | Viscosity (mPa · s) | 35.7 | 35.7 | 35.7 | 35.7 |
| Oil-in-water emulsion | Average Particle Diameter of Oil Phase (μm) | 15.4 | 24.6 | 32.9 | 52.8 |
| Average Particle Diameter of Oil Phase in Oil-in-water Emulsion/Average Particle Diameter of Oil Phase in Pre-emulsion | | 0.28 | 0.41 | 0.56 | 0.97 |
| State of Discharged Fluid | | Jet | Jet | Jet | Liquid Column |

TABLE 4

| | | | | Example 2 | Example 9 |
|---|---|---|---|---|---|
| Composition (mass %) | Pre-emulsion | Oil Phase | Silicone | 20 | 20 |
| | | | Oil | — | — |
| | | First Aqueous Phase | Thickener | 0.075 | 0.075 |
| | | | Emulsion Stabilizer | 0.1 | 0.1 |
| | | | Water | 19.83 | 19.83 |
| | Second Aqueous Phase | Thickener | | 0.225 | 0.225 |
| | | Emulsion Stabilizer | | 0.3 | 0.3 |
| | | Water | | 59.48 | 59.48 |
| Pre-emulsion | | Oil Phase/ First Aqueous Phase | | 1 | 1 |
| | | Viscosity (mPa · s) | | 622 | 622 |
| | | Average Particle Diameter of Oil Phase (μm) | | 59.1 | 28.8 |
| | | Phase State | | O/W | O/W |
| | | Linear Velocity (m/s) | | 29.6 | 29 |
| | | Shear Rate ($s^{-1}$) | | 85000 | 83,000 |
| Second Aqueous Phase | | Viscosity (mPa · s) | | 35.7 | 35.7 |
| Oil-in-water emulsion | | Average Particle Diameter of Oil Phase (μm) | | 15.4 | 11.5 |
| Average Particle Diameter of Oil Phase in Oil-in-water Emulsion/Average Particle Diameter of Oil Phase in Pre-emulsion | | | | 0.26 | 0.40 |
| State of Discharged Fluid | | | | Jet | Jet |

TABLE 5

| | | | | Example 1 | Example 10 |
|---|---|---|---|---|---|
| Composition (mass %) | Pre-emulsion | Oil Phase | Silicone | 20 | — |
| | | | Oil | — | 20 |
| | | First Aqueous Phase | Thickener | 0.15 | 0.15 |
| | | | Emulsion Stabilizer | 0.2 | 0.2 |
| | | | Water | 39.65 | 39.65 |
| | Second Aqueous Phase | Thickener | | 0.15 | 0.15 |
| | | Emulsion Stabilizer | | 0.2 | 0.2 |
| | | Water | | 39.65 | 39.65 |
| Pre-emulsion | | Oil Phase/ First Aqueous Phase | | 0.5 | 0.5 |
| | | Viscosity (mPa · s) | | 187 | 120 |
| | | Average Particle Diameter of Oil Phase (μm) | | 55.6 | 91.4 |
| | | Phase State | | O/W | O/W |
| | | Linear Velocity (m/s) | | 29.5 | 20.4 |
| | | Shear Rate ($s^{-1}$) | | 84000 | 58,000 |
| Second Aqueous Phase | | Viscosity (mPa · s) | | 35.7 | 35.7 |
| Oil-in-water emulsion | | Average Particle Diameter of Oil Phase (μm) | | 15.4 | 22.2 |
| Average Particle Diameter of Oil Phase in Oil-in-water Emulsion/Average Particle Diameter of Oil Phase in Pre-emulsion | | | | 0.28 | 0.24 |
| State of Discharged Fluid | | | | Jet | Jet |

TABLE 6

| | | | | Example 1 | Example 11 | Example 12 |
|---|---|---|---|---|---|---|
| Composition (mass %) | Pre-emulsion | Oil Phase | Silicone | 20 | 20 | 20 |
| | | | Oil | — | — | — |
| | | First Aqueous Phase | Thickener | 0.15 | 0.30 | 0.30 |
| | | | Emulsion Stabilizer | 0.2 | 0.2 | 0.2 |
| | | | Water | 39.65 | 39.50 | 39.50 |
| | Second Aqueous Phase | Thickener | | 0.15 | 0.30 | 0.15 |
| | | Emulsion Stabilizer | | 0.2 | 0.2 | 0.2 |
| | | Water | | 39.65 | 39.50 | 39.65 |
| Pre-emulsion | | Oil Phase/ First Aqueous Phase | | 0.5 | 0.5 | 0.5 |
| | | Viscosity (mPa · s) | | 187 | 1030 | 1030 |
| | | Average Particle Diameter of Oil Phase (μm) | | 55.6 | 59.6 | 55.7 |

TABLE 6-continued

| | | Example 1 | Example 11 | Example 12 |
|---|---|---|---|---|
| | Phase State | O/W | O/W | O/W |
| | Linear Velocity (m/s) | 29.5 | 28.8 | 17.2 |
| | Shear Rate ($s^{-1}$) | 84000 | 6,000 | 3,000 |
| Second Aqueous Phase | Viscosity (mPa · s) | 35.7 | 324 | 324 |
| Oil-in-water Emulsion | Average Particle Diameter of Oil Phase (μm) | 15.4 | 12.3 | 22.0 |
| Average Particle Diameter of Oil Phase in Oil-in-water Emulsion/Average Particle Diameter of Oil Phase in Pre-emulsion | | 0.28 | 0.21 | 0.39 |
| State of Discharged Fluid | | Jet | Jet | Jet |

(Measurement of Average Particle Diameter of Oil Phase)

In the pre-emulsion L1 obtained in each of Examples 1 to 12 and Comparative Example 2, the average particle diameter (22° C.) of the oil phase was measured, as an area average particle diameter, by a laser diffraction and scattering method with a laser diffraction/scattering particle size distribution measuring device (LA-960S manufactured by Horiba, Ltd.). Similarly, in the oil-in-water emulsion obtained in each of Examples 1 to 12 and Comparative Examples 1 and 2, the average particle diameter (22° C.) of the oil phase was measured. The average particle diameter of the oil phase in the oil-in-water emulsion obtained in each of Examples 1 to 12 was smaller than the internal diameter of the circular jet nozzle 14 used in each of Examples. In Examples 1 to 12, spouting and diffusing of the pre-emulsion L1 from the jet nozzle 14 were visually observed. Therefore, the fluid discharged from the jet nozzle 14 was determined to be in a jet state in Examples 1 to 12. The results are shown in Tables 1 to 6. In Comparative Example 1, the emulsification state of the pre-emulsion was not maintained, and thus measurement was not performed.

(Measurement of Viscosity)

The viscosities (22° C.) of the pre-emulsion L1 and the second aqueous phase L2 obtained in each of Examples 1 to 12 and Comparative Example 2 were measured with a B-type viscometer (BL manufactured by TOKI SANGYO CO., LTD.) under the following conditions. Similarly, the viscosity of the oil-in-water emulsion obtained in each of Examples 1 to 12 and Comparative Examples 1 and 2 was measured. The results are shown in Tables 1 to 6. A measurement temperature was room temperature (22° C.), which was the same as a temperature during addition of the pre-emulsion L1 to the second liquid phase L2.

When the viscosity was 50 mPa·s or less, a rotor No. 1, a rotation number of 60 rpm, and a measurement time of 1 minute were applied.

When the viscosity was between 50 mPa·s and 20,000 mPa·s, a rotor No. 2, a rotation number of 6 rpm, and a measurement time of 1 minute were applied.

When the viscosity was 20,000 mPa·s or more, a rotor No. 4, a rotation number of 6 rpm, and a measurement time of 1 minute were applied.

INDUSTRIAL APPLICABILITY

The present invention is useful in a technical field of a method for producing an oil-in-water emulsion.

DESCRIPTION OF REFERENCE CHARACTERS

10 Oil-in-water Emulsion Production Apparatus
11 Auxiliary Tank
12 Blending Tank
13 Liquid Supply Pipe
14 Jet Nozzle (Jet Discharge Section)
15 Pump
L1 Pro-emulsion
L2 Second liquid phase

The invention claimed is:

1. A method for producing an oil-in-water emulsion, the method comprising:

adding to a second aqueous phase a jet of an oil-in-water pre-emulsion containing an oil phase dispersed in a first aqueous phase at a linear velocity of 5 m/s or higher, wherein using a blending tank having a jet discharge section, the jet of the pre-emulsion is added from the jet discharge section to the second aqueous phase stored in the blending tank.

2. A method for producing an oil-in-water emulsion, the method comprising:

adding to a second aqueous phase a jet of an oil-in-water pre-emulsion containing an oil phase dispersed in a first aqueous phase at a linear velocity of 5 m/s or higher, wherein the second aqueous phase has a viscosity from 0.1 mPa·s to 20,000 mPa·s inclusive at a temperature at which the jet of the pre-emulsion is added.

3. The method of claim 1, wherein the second aqueous phase has a viscosity from 1 mPa·s to 10,000 mPa·s inclusive at a temperature at which the jet of the pre-emulsion is added.

4. The method of claim 1, wherein a mass ratio of a content of the oil phase to a content of the first aqueous phase in the pre-emulsion is from 0.01 to 4 inclusive.

5. The method of claim 1, wherein a mass ratio of a content of the oil phase to a content of the first aqueous phase in the pre-emulsion is from 0.1 to 3 inclusive.

6. The method of claim 1, wherein the oil phase in the pre-emulsion has an average particle diameter of 2,000 μm or less.

7. The method of claim 1, wherein the oil phase in the pre-emulsion has an average particle diameter from 1 μm to 500 μm inclusive.

8. The method of claim 1, wherein the oil phase in the pre-emulsion has an average particle diameter from 10 μm to 100 μm inclusive.

9. The method of claim 1, wherein the pre-emulsion has a viscosity from 1 mPa·s to 15,000 mPa·s inclusive at a temperature at which the jet of the pre-emulsion is added to the second aqueous phase.

10. The method of claim 1, wherein the pre-emulsion has a viscosity from 10 mPa·s to 6,000 mPa·s inclusive at a temperature at which the jet of the pre-emulsion is added to the second aqueous phase.

11. The method of claim 1, wherein the viscosity of the second aqueous phase (at a temperature at which the jet of the pre-emulsion is added) is lower than the viscosity of the pre-emulsion (at a temperature at which the jet of the pre-emulsion is added to the second aqueous phase).

12. The method of claim 1, wherein the second aqueous phase has a same constituent component as that of the first aqueous phase in the pre-emulsion.

13. The method of claim 1, wherein the oil phase contains an oil and/or a silicone.

14. The method of claim 1, wherein the oil phase in the produced oil-in-water emulsion has an average particle diameter of 35 μm or less.

15. The method of claim 1, wherein the oil phase in the produced oil-in-water emulsion has an average particle diameter from 1 μm to 20 μm inclusive.

16. The method of claim 1, wherein the adding of the jet of the pre-emulsion to the second aqueous phase is performed using a nozzle.

17. The method of claim 16, wherein the nozzle has an inner diameter from 0.01 mm to 20 mm inclusive.

18. The method of claim 1, wherein the linear velocity of the pre-emulsion during addition of the jet of the pre-emulsion to the second aqueous phase is from 10 m/s to 100 m/s inclusive.

19. A method for producing an oil-in-water emulsion, the method comprising:

adding to a second aqueous phase a jet of an oil-in-water pre-emulsion containing an oil phase dispersed in a first aqueous phase at a linear velocity of 5 m/s or higher, wherein a shear rate of the pre-emulsion during addition of the jet of the pre-emulsion to the second aqueous phase is from 2,500 $s^{-1}$ to 500,000 $s^{-1}$ inclusive.

20. The method of claim 1, wherein a shear rate of the pre-emulsion during addition of the jet of the pre-emulsion to the second aqueous phase is from 5,000 $s^{-1}$ to 400,000 $s^{-1}$ inclusive.

21. The method of claim 2, wherein using a blending tank having a jet discharge section, the jet of the pre-emulsion is added from the jet discharge section to the second aqueous phase stored in the blending tank.

22. The method of claim 19, wherein using a blending tank having a jet discharge section, the jet of the pre-emulsion is added from the jet discharge section to the second aqueous phase stored in the blending tank.

* * * * *